Dec. 4, 1934.  H. S. EBERHARD  1,982,727
MOTOR VEHICLE
Filed Dec. 8, 1930    2 Sheets-Sheet 1
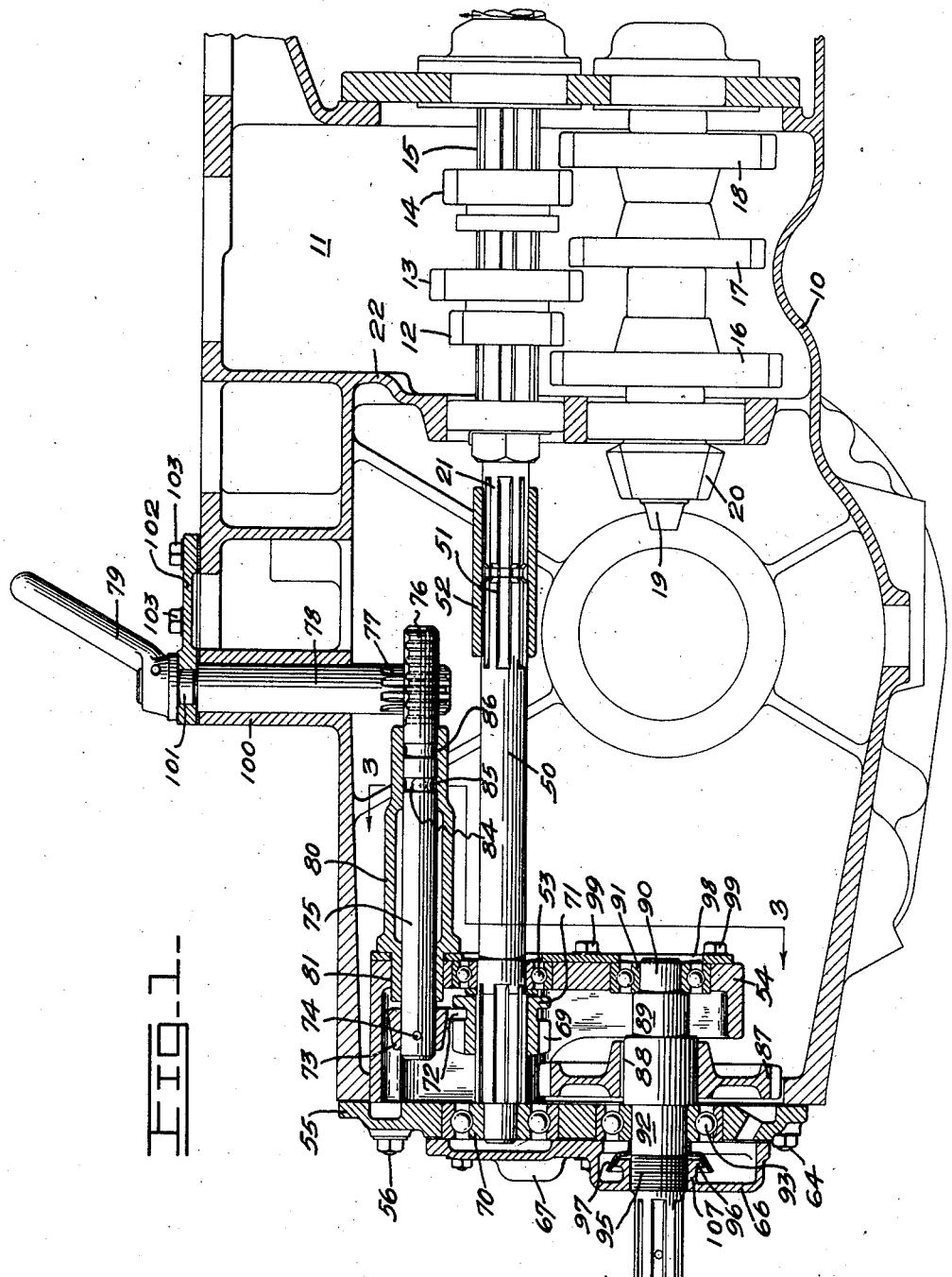
INVENTOR.
Harmon S. Eberhard
BY
ATTORNEYS.

Dec. 4, 1934.    H. S. EBERHARD    1,982,727
MOTOR VEHICLE
Filed Dec. 8, 1930    2 Sheets-Sheet 2
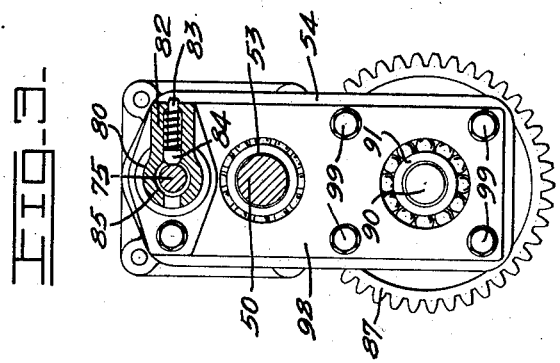
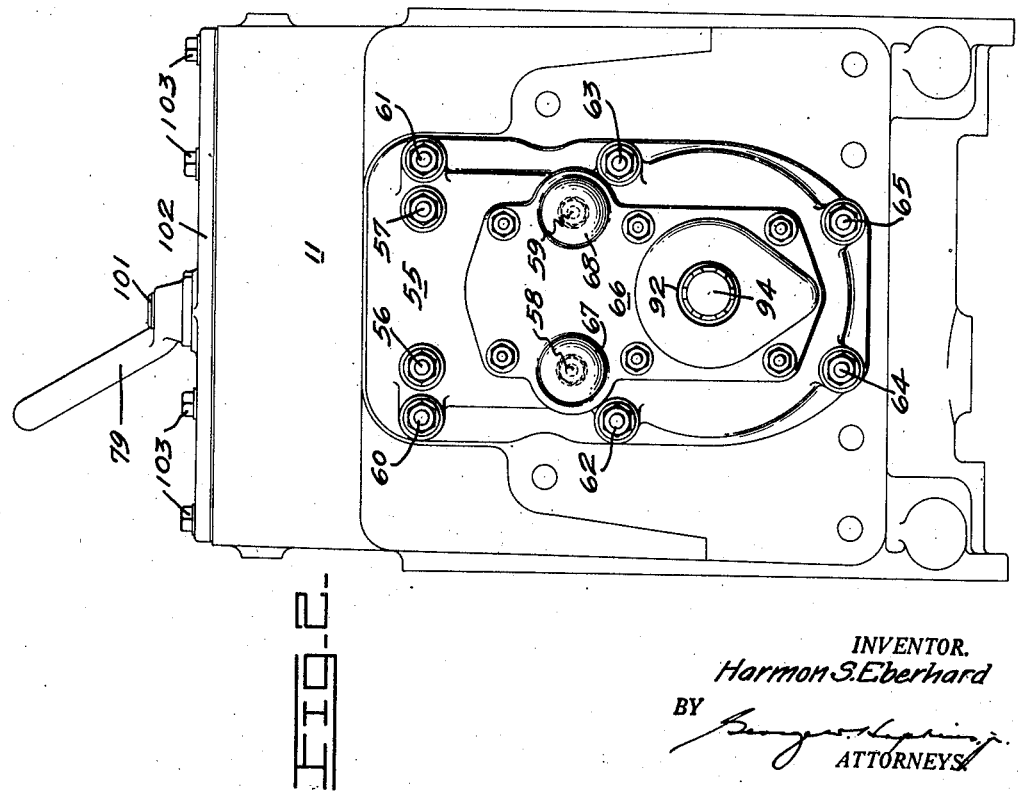
INVENTOR.
Harmon S. Eberhard
BY
ATTORNEYS Patented Dec. 4, 1934

1,982,727

UNITED STATES PATENT OFFICE 1,982,727

MOTOR VEHICLE

Harmon S. Eberhard, San Leandro, Calif., assignor to Caterpillar Tractor Co., San Leandro, Calif., a corporation of California Application December 8, 1930, Serial No. 500,849

20 Claims. (Cl. 74—11)

My invention relates to motor vehicles and particularly to tractors, and the objects of my invention are: first, to provide a tractor with a power take-off device; second, to provide a tractor with a power take-off device particularly designed for attachment to the tractor transmission.

Description of figures

Fig. 1 is a longitudinal section through the rear portion of a motor vehicle.
Fig. 2 is a rear elevation.
Fig. 3 is a section on line 3—3 in Fig. 1.

Description of mechanism

My power take-off as disclosed in the drawings is particularly designed for attachment to a motor vehicle of the tractor type, the transmission case of which is shown at 10. In the forward compartment 11 is the usual change speed transmission gearing comprising shiftable gears 12, 13, 14, mounted on splined shaft 15 and adapted to be engaged with gears 16, 17, 18, respectively, on shaft 19, on the rear end of which is mounted bevel pinion 20 which engages with a bevel gear on a transverse shaft not shown for driving the traction devices on either side of the tractor.

Shaft 15 has splined end 21 which projects rearwardly through housing partition 22. To this splined end 21, shaft 50 of the power take-off attachment is adapted to be coupled, and for this purpose forward end of shaft 50 is splined at 51 so that the shafts may be telescopically coupled together as shown in Fig. 1 by sleeve 52 which is internally splined. Shaft 50 is mounted in anti-friction bearings 53 in a frame 54 which is fastened to mounting plate 55 by studs 56, 57, 58, 59, which are threaded into frame 54 and pass through apertures in mounting plate 55 to receive nuts as shown in Fig. 2. Mounting plate 55 is secured to the rear end of case 10 by means of studs 60, 61, 62, 63, 64, 65, which are threaded into case 10 and pass through apertures in mounting plate 55 and are provided with nuts as shown in Fig. 2. Mounting plate 55 is provided with an aperture which is covered by cover plate 66. Dome-like portions 67 and 68 are formed in cover plate 66 to give clearance to studs 58, 59. The rearward end of shaft 50 is mounted in anti-friction bearing 70 in mounting plate 55.

A portion of shaft 50 intermediate its bearings is splined and pinion 69 is slidably mounted thereon. Pinion 69 is provided with grooved collar 71 to receive arm 72 having hub 73 pinned at 74 to the rearward end of shift rod 75, the forward end of which is cut on one side to form rack teeth 76 with which engage teeth 77 cut in the lower portion of operating shaft 78 which extends upwardly through apertured boss 100 in case 10. The upper end of shaft 78 is reduced in diameter as shown at 101 to pass through an aperture in plate 102 which is removably attached by screws 103 to case 10. Where shaft 78 projects outside of plate 102, it has operating lever 79 pinned thereto. Shift rod 75 is mounted in sleeve 80 which is supported at 81 in frame 54 and is formed at 82, as shown in Fig. 3, to provide a housing and support for spring-pressed plunger 83 having head 84 adapted to seat either in groove 85 or groove 86 to position pinion 69 either in the inoperative position shown in Fig. 1 where head 84 is seated in groove 85, or in operative position with pinion 69 in mesh with gear 87.

Gear 87 is keyed at 88 to shaft 89 which is supported at its forward end 90 in anti-friction bearing 91 in frame 54 and intermediate its ends at 92 in anti-friction bearings 93 in mounting plate 55. At its rear end 94, shaft 89 is splined for the attachment of power transmission mechanism.

Cover plate 66 is provided with an apertured boss 107 through which shaft 89 projects and the portion of shaft 89 which passes through boss 107 is threaded at 95 in such a manner that during operation of the shaft, any lubricant which attempts to escape from the casing around shaft 89 is fed back by screw thread 95. In addition, boss 107 has an outwardly projecting flange 96 with which a complemental part 97 secured to shaft 89 cooperates to further prevent escape of lubricant around shaft 89. To retain bearings 53 and 91 in place in frame 54, a retainer plate 98 is attached to the rear face of frame 54 as shown in Fig. 3 by cap screws 99. Cover plate 66 serves to retain bearings 70 and 93 in place in mounting plate 55.

To remove the device from the tractor, screws 103 are removed so that shaft 78 can be lifted to disengage teeth 77 from teeth 76 and the nuts are removed from studs 60—65 so that frame 54 and mounting plate 55 with the mechanism assembled therein can be withdrawn as a unit from the rear end of the tractor, and it will readily appear how the device is installed in the tractor.

I, therefore, claim as my invention:

1. In a motor vehicle, a transmission housing, a plate fixedly attachable thereto, and a plurality of power transmitting shafts journaled in said plate and extending into said transmission housing, one of said shafts being a power take-off shaft extending outwardly from said plate and said housing.

2. In a motor vehicle, a transmission housing having an aperture therein, a plate adapted to be fixedly fastened over said aperture, a frame entirely supported by said plate and adapted to extend into said housing, and a power take-off shaft journaled in said plate and in said frame.

3. In a motor vehicle, a transmission housing, a plate adapted to be fixed thereto, a frame secured to said plate on the side of said plate toward said housing, a plurality of shafts mounted in said plate and said frame, and means selectively operable to connect said shafts for power transmission.

4. In a motor vehicle, a transmission housing, a power take-off unit attachable therein, comprising a mounting plate, a frame attached thereto, a splined shaft journaled in said plate and in said frame, a driving gear slidably mounted on said shaft, a second shaft journaled in said plate and in said frame, a driven gear fastened thereto, and means selectively operable to engage and disengage said gears.

5. In a motor vehicle, a transmission housing, a power take-off unit attachable therein, comprising a mounting plate, a frame attached thereto, a splined shaft journaled in said plate and in said frame, a driving gear slidably mounted on said shaft, a second shaft journaled in said plate and in said frame, a driven gear fastened thereto, and means selectively operable to engage and disengage said gears, comprising a shifting means for said slidable gear slidably mounted in said frame.

6. In a motor vehicle, a transmission housing, a power take-off unit attachable therein, comprising a mounting plate, a frame attached thereto, a splined shaft journaled in said plate and in said frame, a driving gear slidably mounted on said shaft, a second shaft journaled in said plate and in said frame, a driven gear fastened thereto, and means selectively operable to engage and disengage said gears, comprising a shift rod slidably mounted in said frame, and a member attached thereto for operating said gear, and means to shift said rod, having a portion outside said transmission housing equipped with operating means.

7. In a motor vehicle, a transmission mechanism, a housing therefor, including an aperture, a plate for attachment to said housing over said aperture, a frame entirely supported by said plate including a portion spaced from said plate, a shaft journaled in said plate and in said spaced frame portion and extending through said plate to provide a power take-off, a second shaft journaled in said spaced frame portion and in said plate and connected to said transmission mechanism, means operable to connect and disconnect said shafts, and operating mechanism therefor, including a third shaft mounted in said spaced frame portion, movement of said third shaft controlling the connection between said first two shafts.

8. In a motor vehicle, a transmission mechanism, a housing therefor, having two apertures, a plate for attachment to said housing over one of said apertures, a frame entirely supported by said plate including a portion spaced from said plate, a shaft journaled in said plate and in said spaced frame portion and extending through said plate to provide a power take-off, a second shaft journaled in said spaced frame portion and in said plate and connected to said transmission mechanism, a gear on said first shaft, a second gear on said second shaft, a device for moving one of said gears into and out of mesh with the other of said gears, including a third shaft mounted in said spaced frame portion, and a member inserted into said housing through the other of said apertures therein for operative connection with said third shaft.

9. In a motor vehicle, a transmission housing having an aperture, and a power take-off unit attachable to said housing and adapted to cover said aperture; said power take-off unit comprising a plate, a frame attached thereto, a splined shaft adapted to be connected to said transmission and journaled in said plate and in said frame, a driving gear slidably mounted on said shaft, a power take-off shaft journaled in said plate and in said frame, a driven gear fastened thereto, and means including a shift rod slidably mounted in said unit for selectively engaging and disengaging said gears.

10. In a motor vehicle, a transmission housing having an aperture, and a power take-off unit attachable to said housing and adapted to cover said aperture; said power take-off unit comprising a plate, a frame attached thereto and providing a space between it and the plate; a splined shaft adapted to be connected to said transmission and journaled in said plate and in said frame, a driving gear slidably mounted on said shaft in the space between said frame and plate, a power take-off shaft extending outwardly of the unit and journaled in said plate and in said frame in spaced relationship to said splined shaft, a driven gear fastened to said power take-off shaft in said space and adapted to mesh with the slidably mounted gear, and means including a member slidably mounted in said unit for selectively engaging and disengaging said gears.

11. In a motor vehicle, a housing, change speed transmission mechanism in said housing for transmitting power from the engine to the traction devices of the vehicle, including a plurality of coaxial gears, a shaft coaxial with said gears, and a power take-off unit attached to said housing, comprising a plate, a plurality of shafts, bearings for said shafts in said plate, a frame, bearings for said last mentioned shafts in said frame, means to secure said frame to said plate, so that said bearings are in alignment to support said last mentioned shafts, said last mentioned shafts having shoulders abutting said bearings to prevent axial displacement of said last mentioned shafts with respect to said power take-off unit, and means for attaching said unit to said housing after said last mentioned shafts have been assembled therein, so that an end of one of said last mentioned shafts is in position for connection to said transmission shaft on the side of the gears coaxial therewith remote from the engine.

12. In a motor vehicle, a housing, power-driven mechanism in said housing, said housing having an aperture therein, a power take-off unit attached to said housing and covering said aperture, comprising two parallel shafts having overlapping portions, one of said shafts extending into said housing for connection to said power-driven mechanism, the other of said shafts extending outside said housing for power take-off purposes, and gears on the overlapping portions of said shafts adapted to be intermeshed for transmitting power from one shaft to the other.

13. In a motor vehicle, a housing, power-driven mechanism in said housing, said housing having an aperture therein, a power take-off unit attached to said housing and covering said aperture, comprising two parallel shafts having overlapping portions, one of said shafts extending into said housing for connection to said power-driven mechanism, the other of said shafts extending outside said housing for power take-off purposes, and gears on the overlapping portions of said shafts adapted to be intermeshed for transmitting power from one shaft to the other, and a third shaft parallel to said first two shafts operable to move one of said gears into and out of mesh with another of said gears.

14. In a motor vehicle, a housing, power-driven mechanism in said housing, said housing having an aperture therein, a power take-off unit attached to said housing and covering said aperture, comprising two parallel shafts having overlapping portions, one of said shafts extending into said housing for connection to said power-driven mechanism, the other of said shafts extending outside said housing for power take-off purposes, and gears on the overlapping portions of said shafts adapted to be intermeshed for transmitting power from one shaft to the other, said gears being located inside said housing when said power take-off unit is attached thereto.

15. In a motor vehicle, a housing, having an aperture therein, power-driven mechanism in said housing, a cover for said aperture attached to said housing, power take-off mechanism mounted on said cover and removable therewith as a unit, comprising a shaft extending into said housing for connection with said power-driven mechanism, a second shaft extending outside said cover for power take-off purposes, means to transmit power from said first shaft to said second shaft, and a device to control the operation of said power transmitting means, including a third shaft, the axes of said first and third shafts passing through said aperture in said housing.

16. In a motor vehicle, a housing, having an aperture therein power-driven mechanism in said housing, a cover for said aperture attached to said housing, power take-off mechanism mounted upon said cover and removable as a unit therewith, comprising a shaft extending into said housing for connection with said power-driven mechanism, another shaft extending outside said cover for power take-off purposes, and means to transmit power from said first shaft to said second shaft, the axes of said shafts being non-coincident and passing through said aperture in said housing.

17. In a motor vehicle, a housing having two apertures therein, one of said apertures being in the top of said housing and the other being in a wall of said housing, power-driven mechanism in said housing, a cover for said aperture in the wall of said housing, power take-off mechanism mounted on said cover and removable therewith as a unit, comprising a shaft extending into said housing for connection with said power-driven mechanism, a shaft extending outside of said cover for power take-off purposes, means to transmit power from said first shaft to said second shaft, and control means therefor, including a rigid member, a cover for said aperture in the top of said housing, and a device mounted on said latter cover and removable therewith as a unit said device being operable by the operator of said vehicle for actuating said control means and including a rigid member extending into said housing for cooperation with said first-mentioned rigid member in said control means.

18. In a motor vehicle, a housing having a plurality of apertures therein, one of said apertures being in one wall of said housing and another of said apertures being in another wall of said housing disposed transversely with respect to said first mentioned wall, power-driven mechanism in said housing, a cover for one of said apertures, power take-off mechanism mounted on said cover and removable therewith as a unit, comprising a shaft extending into said housing for connection with said power-driven mechanism, a second shaft extending outside of said cover for power take-off purposes, means to transmit power from said first shaft to said second shaft, and control means therefor, including a rigid member mounted on said cover and extending toward said other aperture, a second cover for said other aperture, and a device mounted on said second cover and removable therewith as a unit, said device being operable by the operator of said vehicle for actuating said control means and including a rigid member extending into said housing for cooperation with said control means.

19. In a motor vehicle, a transmission housing having a transmission gear compartment and another compartment at the rear of said gear compartment, said gear compartment enclosing a power-driven shaft projecting into said other compartment, said other compartment having an aperture in the rear wall thereof, a power take-off unit detachably connected as a unit to said other compartment and covering said aperture, comprising parallel shafts having overlapping portions one of said shafts extending into said other compartment for connection with said power-driven shaft, another of said shafts extending outside said other compartment for power take-off purposes, gears on the overlapping portions of said shafts adapted to be intermeshed for transmitting power from one shaft to the other, and means including a control member operable to effect meshing and demeshing of said gears.

20. In a motor vehicle, a housing having a plurality of walls extending transversely with respect to each other, one of said walls having an aperture therein and another of said walls having a second aperture therein; power-driven mechanism in said housing; covering means for said first-mentioned aperture; power take-off mechanism supported by said covering means and removable therewith as a unit, comprising a shaft having an end portion positioned within said housing for connection with said power-driven mechanism, a second shaft extending outside of said covering means for power take-off purposes, means to transmit power from said first-mentioned shaft to said second shaft, and control means therefor including a rigid member supported by said covering means and extending toward said second aperture; second covering means for said second aperture; and a device mounted on said second covering means and removable therewith as a unit, said device being operable by the operator of said vehicle for actuating said control means and including a rigid member having an end portion within said housing for cooperation with said control means.

HARMON S. EBERHARD.